Nov. 20, 1934.   E. W. DAVIS   1,980,984
LUBRICATING APPARATUS
Filed Aug. 15, 1931   2 Sheets-Sheet 1
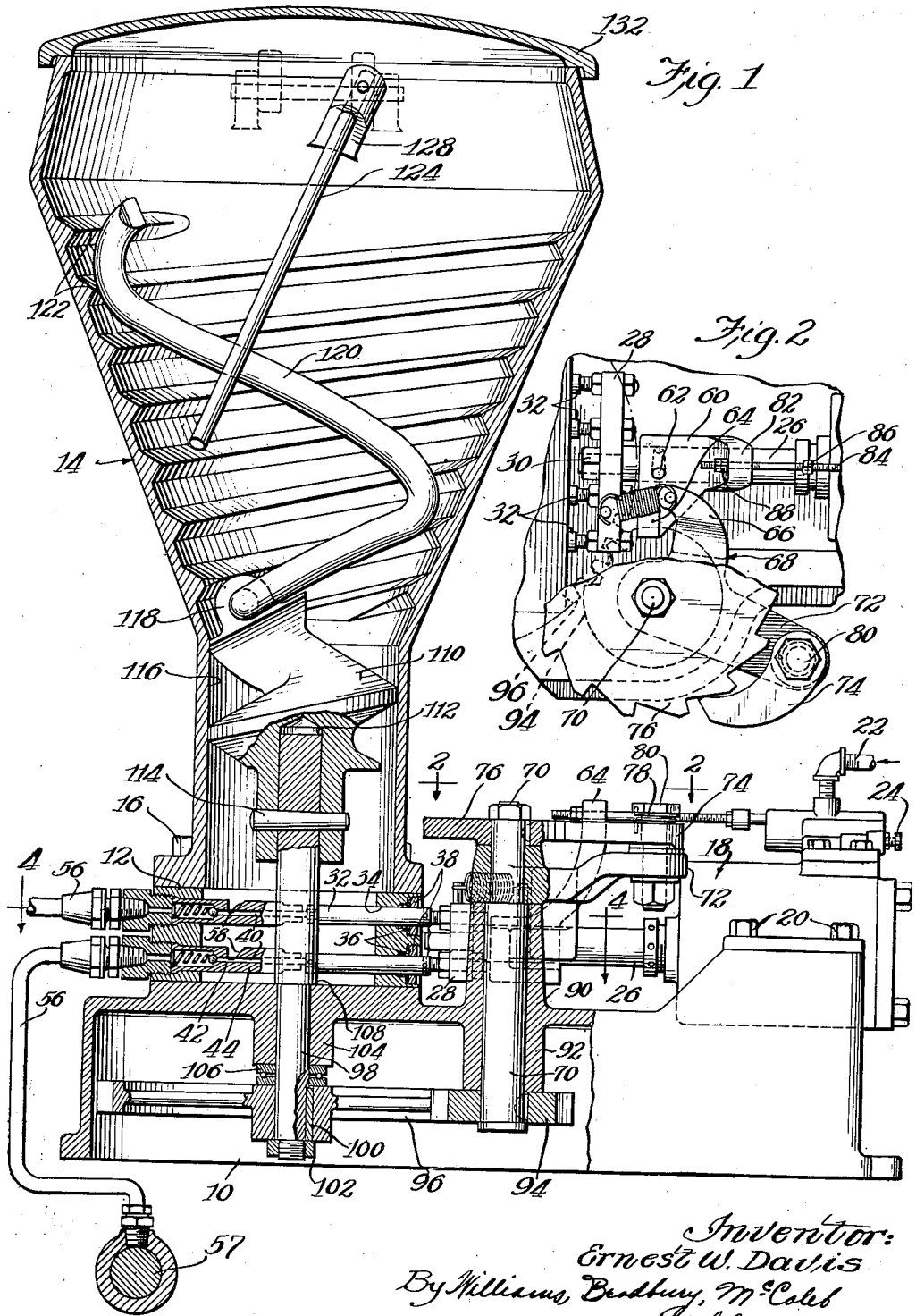
Inventor:
Ernest W. Davis
By Williams, Bradbury, McCaleb
& Hinkle. Attys.

Nov. 20, 1934.                E. W. DAVIS                1,980,984
                        LUBRICATING APPARATUS
                        Filed Aug. 15, 1931         2 Sheets-Sheet  2
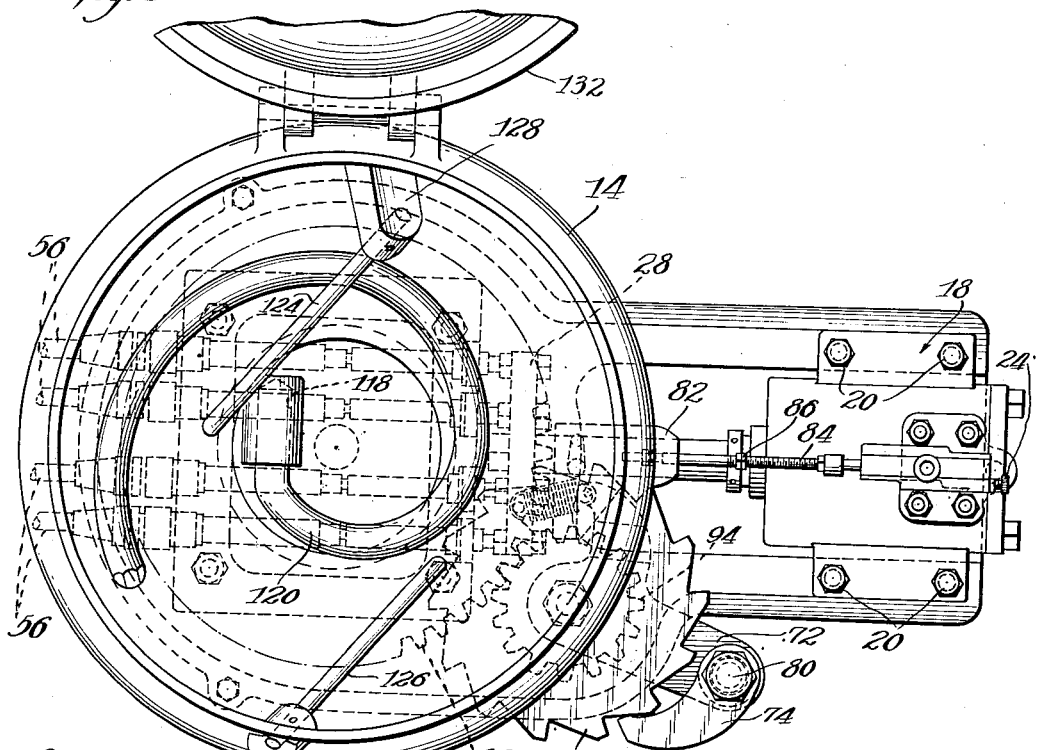
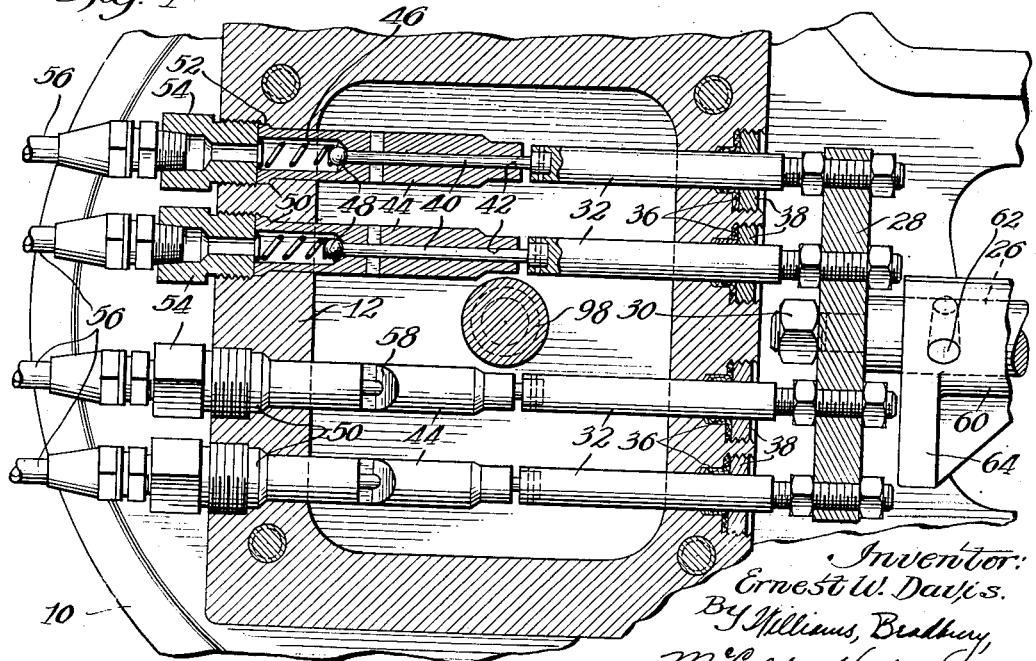

Patented Nov. 20, 1934

1,980,984

UNITED STATES PATENT OFFICE 1,980,984

LUBRICATING APPARATUS

Ernest W. Davis, Oak Park, Ill., assignor to Alemite Corporation, Chicago, Ill., a corporation of Delaware Application August 15, 1931, Serial No. 557,305

12 Claims. (Cl. 184—27)

My invention relates generally to lubricating apparatus and more particularly to lubricant compressors capable of forcing extremely viscous lubricants to bearings to be lubricated.

In the lubrication of many machines having their bearings subjected to high unit bearing pressures it is desirable to use an extremely heavy lubricant. The lubricant generally used is a grease which has a constituency approximately the same as ordinary bar soap. A great deal of difficulty has been experienced in the past in endeavoring to provide a lubricant compressor capable of forcing this heavy grease into the bearings to be lubricated. The difficulty arises in part from the fact that the grease when removed from the barrel containers is usually in the form of large lumps which are difficult to break up into smaller lumps of a size which can pass through the inlet of the cylinder of a lubricant compressor.

It is therefore the object of my invention to provide a lubricant compressor capable of receiving large lumps of hard grease and of breaking up said lumps and feeding the grease to high pressure cylinders under pressure, thereby eliminating air pockets and ejecting the grease from the high pressure cylinders under sufficient pressure to force the grease through conduits to the bearings to be lubricated.

A further object is to provide an improved form of hopper means for a lubricant compressor.

A further object is to provide a lubricant compressor having three separate means operable seriatim to prime the high pressure cylinders.

A further object is to provide a simple and efficient lubricant compressor which can be economically manufactured and operated and used to supply heavy greases under pressure to bearings to be lubricated.

Other objects will appear from the following description reference being had to the accompanying drawings, in which:

Figure 1 is a central vertical sectional view of my improved lubricant compressor, a portion of the power mechanism being shown in elevation;

Figure 2 is a fragmentary plan view showing the mechanism for intermittently transmitting power from the motor to the counter shaft;

Figure 3 is a plan view of the compressor with the hopper cover swung to open position; and Figure 4 is a horizontal sectional view taken on the line 4—4 of Figure 1.

The lubricant compressor of my invention comprises a hollow base 10 which forms a support for a cylinder casing 12 and a hopper 14, the hopper and cylinder casing being secured to the base 10 by suitable bolts or studs 16. A motor 18 is secured to the base 10 by means of studs 20, the motor illustrated being of the reciprocating air operated type and being supplied with compressed air through a pipe 22. The speed of operation of the motor may be regulated by controlling the rate of exhaust of air by means of a needle valve 24. The motor has a reciprocating piston rod 26 having a cross bar 28 rigidly secured at its outer end by means of a nut 30. A plurality of connecting rods 32, here shown as eight in number, are adjustably secured to the cross bar 28 and are guided in suitable bores 34 formed in the cylinder casing 12, a seal between the rods and the casing being effected by hat washer packings 36 held in place by packing bushings 38.

Each of the connecting rods 32 has a plunger 40 secured thereto, the connection between the plungers and the connecting rods preferably permitting a small amount of relative motion between the parts. The plungers 40 are guided in cylinders 42 formed in cylinder fittings 44. In each of the cylinder fittings 44 the cylinder bore 42 terminates in an enlarged outlet bore 46, the shoulder between the cylinders and said outlet bore forming a seat for a spring pressed outlet ball check valve 48. Each of the cylinder fittings has an annular shoulder 50 at its extremity, the shoulder 50 being held against a complemental shoulder 52 formed in the cylinder casing 12 by a threaded bushing 54. A discharge conduit 56 is suitably connected to each of the bushings 54. The cylinder fittings 44 have notches 58 formed intermediate their ends to provide an inlet opening for the high pressure cylinders. From the above description it will appear that reciprocation of the piston rod 26 of the motor will cause simultaneous reciprocation of all of the plungers 40.

The piston rod 26 has a casting 60 rigidly secured thereto as by a taper pin 62, the casting having an upwardly extending lug 64 which lies in front of the extremity of an arm 66 of a bell crank lever 68 which is freely pivoted on a shaft 70. The other arm 72 of the bell crank lever 68 has a pawl 74 pivoted thereupon, the pawl being held in engagement with the face of a ratchet wheel 76 by a torsion spring 78 which is wound about a bolt 80, the latter forming the pivot for the pawl 74. The casting 60 also has an upwardly extending lug 82 through which the valve rod 84 of the compressed air motor is slidable and reciprocated whenever the piston rod 26 approaches the end of its stroke. The timing of the valve operation may of course be controlled by adjustment of nuts 86, 88 which are threaded on the valve rod 84.

The shaft 70 is mounted for free rotation in bearing sleeves 90, 92 formed integrally with the base casting 10. The ratchet wheel 76 is keyed to the upper end of the shaft 70 and a pinion 94 is keyed to the lower end of the shaft. The pinion 94 meshes with a spoked gear 96 which is non-rotatably secured to the lower extremity of a shaft 98 by a key 100 and held thereon by a nut 102 threaded upon the lower end of the shaft. The shaft 98 has a bearing in a downwardly extending boss 104 formed integrally with the base casting 10, a suitable ball bearing assembly 106 being interposed between the hub of the gear 96 and the lower end of the boss 104 to reduce friction therebetween. The shaft 98 has a shoulder 108 which rests upon the top of the cylinder casting 10 to prevent downward movement of the shaft.

A helical conveyor 110 has a socket 112 formed therein to receive the upper end of shaft 98, the conveyor 110 being non-rotatably secured to the shaft 98 by means of a tapered pin 114. The helical conveyor 110 fits snugly within the cylindrical bore 116 of the hopper casting 14. The upper end of the helical conveyor 110 has a socket 118 (Fig. 3) formed therein to receive the end of a wiper rod 120. Said rod 120 is made of a high grade steel and is volute shaped so that the outer surface thereof lies closely adjacent a conical surface defined by the edge of a volute ridge 122 formed on the inner surface of the tapered portion of the hopper 14 and cast integrally therewith. The wiper rod 120 is, however, a counterclockwise volute (Fig. 3), whereas the ridge 122 is a clockwise volute. A pair of scraping rods 124, 126 are held in lugs 128 and 130 respectively, cast integrally with the hopper 14. These scraper rods are made of drill rod and are secured in their respective lugs by means of set screws. A cover 132 is hinged to the hopper 14, suitable means (not shown) being provided to lock the cover in closed position.

In operation, the grease is loaded into the hopper 14. As previously stated, the grease for which this compressor is particularly adapted will be in lumps of various sizes and of a consistency substantially that of ordinary bar soap. When the supply of air is admitted to the air motor 18, the latter will commence reciprocation, and at each reciprocation intermittently rotate the shaft 98 and hence the helical conveyor 110 and wiper rod 120 counterclockwise (Fig. 3) through a relatively small angle at each reciprocation of the pump.

The wiper arm will gradually cut its way through lumps of the lubricant and by forcing the lumps against the rods 124 further tend to break up the larger lumps. Due to the multiple speed reduction between the reciprocating compressed air motor and the wiper arm 120, the latter will be moved with sufficient force to cause the scraper rods 124 gradually to cleave their way through the larger lumps. As the lumps are broken up, the smaller particles drop into the upper end of the cylinder 116 or are forced downwardly by the wiper rod 120, which in its effect upon such smaller particles acts like a cam gradually to force the smaller particles downwardly. During the initial operation the ridge 122 on the inside of the hopper aids in this camming action in forcing the lumps downwardly to the upper end of the cylinder 116. After the device has been in operation for some time, the wiper arm will pack the grease into a substantially homogeneous mass, which is generally conical in shape. The diameter of this conical mass at any plane is slightly less than the diameter of the hopper 14 at said plane. As the wiper rod 120 is rotated about the hopper, it will cause this conical mass to be shifted to the side of the hopper 16 in advance of the wiper rod 120, and at each revolution of the wiper rod a portion of this conical mass will be scraped off by the wiper rod 120 and forced downwardly toward the upper end of the cylinder 116. During this operation the rods 124, 126 prevent the rotation of the conical mass of grease.

Grease is thus continuously fed under slight pressure into the upper end of the cylinder 116, wherein it is acted upon by the helical conveyor 110. This conveyor further compacts the grease, forcing therefrom any air which may have been entrapped therein and maintaining the grease within the lower end of the cylinder 116 at a sufficiently high pressure quickly and thoroughly to prime the cylinders 42 of the several plunger pumps. The pressure developed by the helical screw conveyor is, however, not relied upon to force the grease into the cylinders 42 to prime the latter.

It will be noted that the connecting rods 32 are of considerably greater cross sectional area than the cylinders 42 so that as the former move into the cylinder casting 12, their displacement is many times as great as the combined volume of the cylinders 42, and the lubricant within the cylinder casting 12 in the lower end of the cylinder 116 is compacted and subjected to sufficiently high pressure thoroughly and rapidly to prime the cylinders 42.

The shaft 98 is rotated only upon the retractile strokes of the pump plungers so that as the connecting rods are withdrawn from the pump cylinder casting 12, the helical conveyor 110 will be rotated to force lubricant downwardly into the cylinder casting 12 to fill the partial vacuum which might otherwise be formed upon the withdrawal of the connecting rods 32 from the pump cylinder casting 12. Upon the discharge stroke the plungers 40 force the lubricant contained in their respective cylinders 42 past the check valves 48 into the conduits 56 to the various bearings 57 to be lubricated.

The apparatus is adapted to supply lubricant to a plurality of bearings of a machine, such as a rolling mill, in which the bearings are subjected to great pressure. When thus used, the air will be continuously supplied under pressure to the air motor 18 and the lubricant thus fed substantially continuously to the bearings. The rate at which the lubricant is supplied may, however, be easily controlled throughout a comparatively wide range by means of the needle valve 24. It is found that the lubricator of my invention will handle greases of the heaviest kinds, which, with the methods formerly in use, could be only manually applied. The provision of my improved apparatus thus makes possible the automatic centralized lubrication of bearings under heavy load, for the lubrication of which there was previously no automatic means available.

While I have illustrated and described a preferred embodiment of my invention, many modifications may be made without departing from the spirit of the invention, and I do not wish to be limited to the precise details set forth but desire to avail myself of all changes within the scope of the appended claims.

I claim:

1. In a compressor for heavy non-fluid lubricants, the combination of a high pressure pump having an inlet, and means for priming said pump through said inlet comprising a substantially conical hopper having a clockwise volute ridge formed on the inner wall thereof, a counter-clockwise volute bar movable closely adjacent said ridge, and means to rotate said bar.

2. In an apparatus of the class described, the combination of a hopper having a conical spiral ridge formed on the inner wall thereof, a conically spiral-shaped member positioned adjacent the wall of said hopper, a fixed element spaced from the wall of said hopper a sufficient distance to permit passage of said member between it and said wall, and means for rotating said member.

3. In an apparatus of the class described, the combination of a substantially frusto-conical hopper, a conically spiral-shaped member conformed to the shape of said hopper, means for revolving said member, and a bar rigidly secured to said hopper, extending downwardly therein at an angle sloping in the direction of revolution of said member and positioned within a cone defined by the path of said member.

4. In an apparatus of the class described, the combination of a frusto-conical hopper terminating at its lower end in a cylinder, the inner wall of the frusto-conical portion of said hopper having a conically spiral ridge formed thereon, a member conically spiral in shape revolvable within said hopper in a path closely adjacent said ridge, said member being spiral in a direction opposite to that of said ridge, means projecting within the hopper to deter rotative movement of a mass of grease within said hopper by said member, a helical conveyor operable in the cylindrical portion of said hopper, and common means for rotating said conveyor and revolving said member.

5. In an apparatus of the class described, the combination of a base, a motor mounted thereon, said motor having a reciprocating power transmitting means, a plurality of plungers secured to said means for reciprocation thereby, cylinders for said plungers, a hopper above said cylinders, a spiral conical member for forcing lubricant from said hopper into said cylinders, and mechanism for revolving said member, said mechanism being operated by said means upon the return reciprocatory stroke thereof.

6. In an apparatus of the class described, the combination of a base, a reciprocating motor mounted on said base, a plurality of pump plungers directly reciprocated by said motor, cylinders therefor, a hopper for containing lubricant to be supplied under pressure to said cylinders, rotating means for forcing lubricant from said hopper to said cylinders, and a pawl and ratchet mechanism for transmitting power from said motor to said means during the return stroke of said plungers.

7. In an apparatus of the class described, the combination of a hollow cylinder supporting casting, a plurality of pump cylinders projecting into the hollowed portion of said casting, said cylinders having their inlets open to the interior hollow portion of said casting, conduit means for connecting the discharge of said cylinders to receiving means outside of said casting, plungers reciprocable in said cylinders, a connecting rod loosely connected to each of said plungers, said connecting rods projecting through the wall of said casting, a common reciprocating motor for reciprocating said connecting rods, and means to supply lubricant under pressure into the hollowed portion of said casting, said means being operated by said motor upon the return stroke thereof.

8. In a compressor for heavy non-fluid lubricants, the combination of a high pressure pump having an inlet, and means for priming said pump through said inlet comprising a hopper having a clockwise spiral ridge formed on the inner wall thereof, a counterclockwise spiral bar movable closely adjacent said ridge, and means relatively to rotate said bar and hopper.

9. In an apparatus of the class described, the combination of a hopper having a spiral ridge formed on the inner wall thereof, a spiral-shaped member positioned adjacent the wall of said hopper, a fixed element spaced from the wall of said hopper a sufficient distance to permit passage of said member between it and said wall, and means for relatively rotating said member and said hopper.

10. In an apparatus of the class described, the combination of a hopper, a spiral-shaped member conformed to the shape of said hopper, means for revolving said member, and an element rigidly secured to said hopper, extending downwardly therein at an angle sloping in the direction of revolution of said member and positioned inside the path of said member.

11. In an apparatus of the class described, the combination of a base, a motor mounted thereon, said motor having a reciprocating power transmitting means, a plunger connected to said means for reciprocation thereby, a cylinder for said plunger, a hopper above said cylinder, a spiral conical member for forcing lubricant from said hopper to said cylinder, and mechanism for revolving said member, said mechanism being operated by said means upon the return reciprocatory stroke thereof.

12. In an apparatus of the class described, the combination of a base, a reciprocating motor mounted on said base, a pump plunger reciprocable by said motor, a cylinder for said plunger, a hopper for containing lubricant to be supplied under pressure to said cylinder, rotating means for forcing lubricant from said hopper to said cylinder, and a pawl and ratchet mechanism for transmitting power from said motor to said means during the return stroke of said plunger.

ERNEST W. DAVIS.